C. C. FARMER.
CAR DOOR AND BRAKE CONTROL DEVICE.
APPLICATION FILED MAR. 26, 1920.
1,408,874. Patented Mar. 7, 1922.
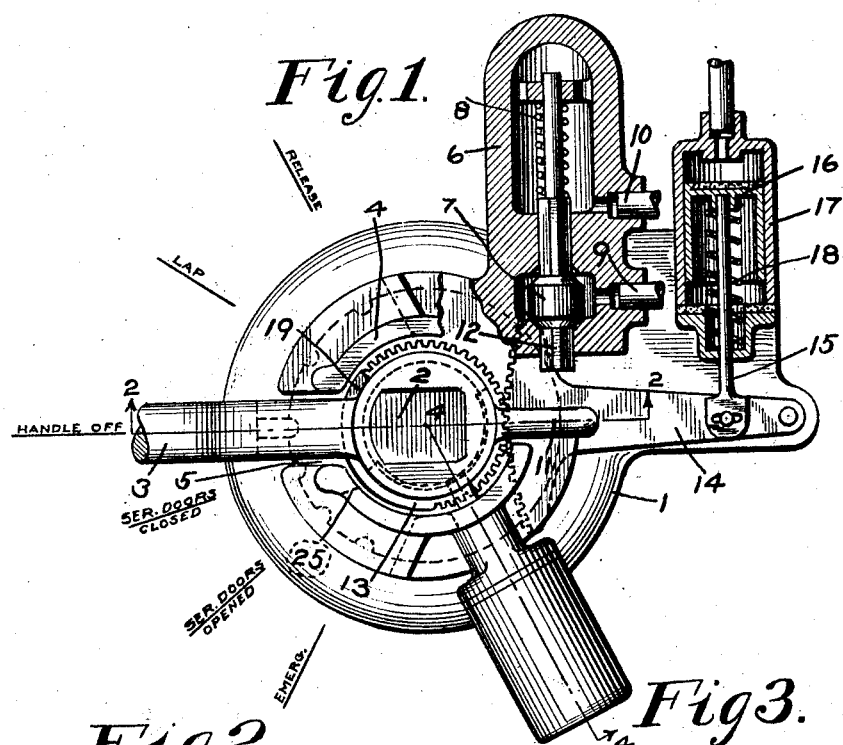
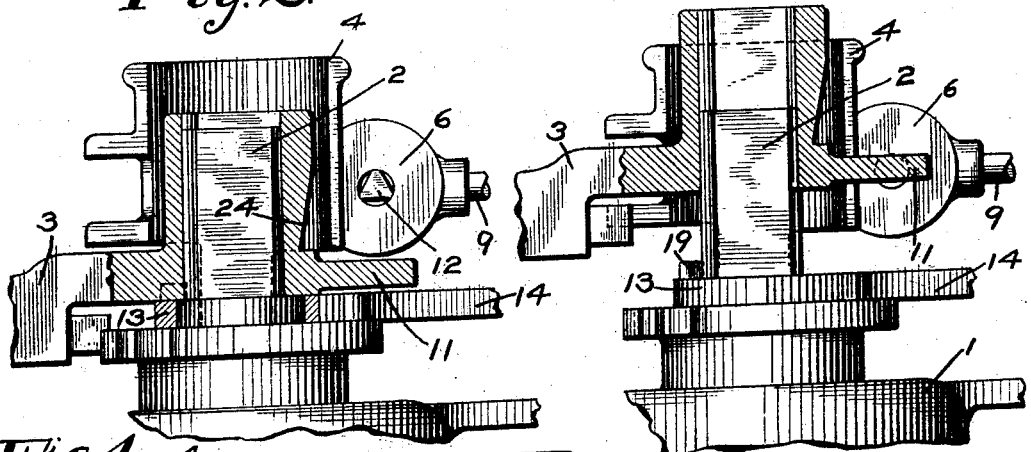
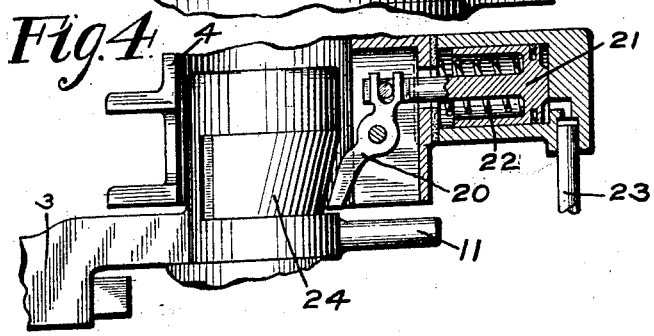
INVENTOR
CLYDE C. FARMER
BY *Wm. M. Cady*
ATTORNEY

UNITED STATES PATENT OFFICE.

CLYDE C. FARMER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

CAR DOOR AND BRAKE CONTROL DEVICE.

1,408,874.      Specification of Letters Patent.      Patented Mar. 7, 1922.

Application filed March 26, 1920. Serial No. 368,910.

*To all whom it may concern:*

Be it known that I, CLYDE C. FARMER, a citizen of the United States, residing at Edgewood, in the county of Allegheny and State of Pennsylvania, have invented new and useful Improvements in Car-Door and Brake-Control Devices, of which the following is a specification.

This invention relates to car brake and door controlling devices, and more particularly adapted for safety car control equipments.

It has heretofore been proposed to provide a safety car control equipment in which the release of the controlling handle causes an emergency application of the brakes.

It is sometimes necessary for the car operator to leave the car, as, for example, when the car is run into a car barn and in such cases it is not necessary for safety to have the brakes applied in emergency nor is it desirable, particularly as it is usual to provide means for sanding the track when an emergency application of the brakes is made and since this would result in a waste of sand and compressed air.

It is, however, desirable that the operator apply the brakes to some extent, as by a straight air application, before he leaves the car.

One object of my invention is to provide means for preventing the release of the handle from causing an emergency application of the brakes when the operator leaves the car.

Another object of my invention is to provide means for preventing an emergency application of the brakes upon release of the controlling handle, the release of the handle being then adapted to cause a service application of the brakes.

Another object of my invention is to provide means for permitting the operator to open and close the car doors if he desires to leave the car and without causing an emergency application of the brakes.

In the accompanying drawing; Fig. 1 is a plan view, partly in section, of a brake valve device embodying my invention; Fig. 2 an elevational view, partly in section, on line 2—2 of Fig. 1, of the brake valve device, showing the operating handle in its normal operating plane; Fig. 3 a similar view, showing the operating handle in its other operating plane; and Fig. 4 a sectional view on the line 4—4 of Fig. 1.

In the drawing, the reference numeral 1 indicates the usual valve body of a brake valve device and within the valve body is the usual rotary valve (not shown) having positions for controlling the car brakes and the doors.

The stem 2 for operating the rotary valve is provided with a handle 3 which is mounted in a handle guard 4, having a vertical opening 5, through which the handle may be removed from the stem 2.

Applied to the valve body 1 is a valve casing 6, containing a double beat valve 7 adapted to be seated normally in one position by a coil spring 8.

A pipe 9 is connected to the pipe which leads to the usual door engine (not shown) and through which fluid under pressure is supplied to the door engine for effecting the closing of the car door, and the pipe 10 is connected to a passage in the brake valve device, leading to the seat of the rotary valve, so that in the normal position of the double beat valve 7, communication is established from the brake valve through pipe 10, past the double check valve 7 to pipe 9 and the door engine.

In addition to the usual operating plane, the handle guard 4 is constructed so as to permit the operation of the handle 3 in an upper plane, as shown in Fig. 3 of the drawing, in which a finger 11, projecting from the handle 3 is so positioned as to engage the stem 12 of the double beat valve 7.

The brake valve device may be provided with operating positions indicated in Fig. 1 of the drawings, namely, release, lap, handle off, service application with doors closed, service application with doors opened, and emergency application position.

Means are provided for throwing the brake valve handle to emergency application position upon release of the handle, which may comprise a ring 13 having gear teeth and loosely mounted on the valve stem 2. An arm 14, pivotally mounted on an extension of the valve body 1, is provided with gear teeth adapted to mesh with the gear teeth of the ring 13 and at an intermediate point, a piston rod 15 is connected to said arm.

A piston 16, mounted in a cylinder 17, is connected to piston rod 15 and is acted upon by a spring 18 which tends to move the arm 14, so as to rotate the ring 13. Said ring is provided with a lug 19, adapted to engage the handle 3 and move same when the ring is rotated, so that, upon release of the handle, the same will be shifted to emergency application position by the action of the spring 18.

In order to prevent the removal of the brake valve handle in the off position unless a service application of the brakes is first made, a locking device may be provided, comprising a pivotally mounted latch member 20, adapted to normally engage in an annular notch 24, cut in the hub of the handle.

The latch member 20 is pivotally connected to a piston 21 which is normally maintained in the locking position by a spring 22. The opposite side of the piston 21 is connected to a pipe 23 which is adapted to be supplied with fluid under pressure when a straight air application of the brakes is made.

Fluid under pressure supplied to the piston 21 causes the movement of said piston, against the pressure of spring 22, so as to shift the latch 20, and thereby permit the handle to be removed or lifted in the handle off position.

In operation, if the operator desires to remove the brake valve handle for the purpose of going to the other end of the car, or any other purpose, he must first make a service application of the brakes, in order to release the latch 20. Then upon movement of the handle to the handle off position the handle may be removed.

If the operator wishes to leave the car, as when the car is run into a car barn, he must first move the handle of the brake valve to service application position, in order to release the latch 20, and then move the handle to the handle off position and lift same to the additional operating plane, as shown in Fig. 3 of the drawing.

In this operating plane, upon release of the handle, the same will be moved by the action of the spring 18, but the movement is limited by the engagement of the handle with a stop 25 formed in the handle guard 4, so that the handle will only move to the service doors closed position. In moving to this position, the double beat valve 7 is operated by the finger 11, so as to vent fluid under pressure from the pipe 9. As the pipe 9 leads to the door closing side of the door engine, the fluid pressure which acts to hold the car doors closed is released, and the car door engine is balanced, so that the operator can manually open the door in order to leave the car, and then close the door upon leaving the car.

It will be noted that a service application of the brakes would be effected and the fluid pressures on the door engine would be balanced by simply moving the handle to handle off position and then lifting the same to the additional operating plane, but the locking device is preferably employed, so that the handle cannot be lifted in the handle off position, for removal, without first making a service application of the brakes.

Having now described my invention, what I claim as new and desire to secure by Letters Patent, is:—

1. The combination with a brake valve device having an operating handle, of means normally operative upon release of the handle for shifting the handle to emergency application position, said handle being manually movable to a position in which movement of the handle to emergency position is prevented upon release of the handle.

2. The combination with a brake valve device having an operating handle, of means normally operative upon release of the handle for shifting the handle to emergency application position, said handle having a normal operating plane and an additional operating plane, and a stop for preventing movement of the handle to emergency position when the handle is in the additional operating plane.

3. The combination with a brake valve device having an operating handle provided with a normal operating plane and an additional operating plane, of means operating upon release of the handle in the normal operating plane for moving the handle to emergency application position and a stop for limiting the movement of the handle to service application position in the additional operating plane.

4. The combination with a brake valve device having an operating handle provided with a normal operating plane and an additional operating plane, of a pipe through which fluid under pressure is supplied for holding a car door closed and valve means operated by said handle in the additional operating plane for venting fluid from said pipe to permit the car door to be manually opened.

5. The combination with a brake valve device having an operating handle provided with a normal operating plane and an additional operating plane, of a pipe through which fluid under pressure is supplied for holding a car door closed and valve means operated upon movement of said handle to service application position in the additional operating plane for venting fluid from said pipe to permit the car door to be manually opened.

6. The combination with a brake valve device having an operating handle provided with a normal operating plane and an additional operating plane, of a pipe through which fluid under pressure is supplied for holding a car door closed and valve means adapted to be operated in the normal operating plane and an additional operating plane, of means operated upon release of the handle in the normal operating plane for shifting said handle to effect an emergency application of the brakes and means for limiting the movement of the handle, upon release in the additional plane, to a position for effecting a service application of the brakes.

7. The combination with a brake valve device having an operating handle adapted to operate in a normal operating plane and an additional operating plane, of means operating upon release of the handle for shifting said handle to a position for effecting an emergency application of the brakes, a pipe through which fluid is supplied for holding a car door closed, valve means operated upon release of the handle in the additional operating plane for venting fluid from said pipe to permit the car door to be manually opened and closed, and a stop for limiting the movement of said handle to a position for effecting a service application of the brakes.

In testimony whereof I have hereunto set my hand.

CLYDE C. FARMER.